March 18, 1952 C. E. SCHMITZ 2,589,631

DRIVE FOR WASHER OF MECHANICAL ROTARY SEALS

Filed Nov. 21, 1947

INVENTOR.
Carl E. Schmitz
BY
Charles F. Vojtech
atty.

Patented Mar. 18, 1952

2,589,631

UNITED STATES PATENT OFFICE 2,589,631

DRIVE FOR WASHER OF MECHANICAL ROTARY SEALS

Carl E. Schmitz, Chicago, Ill., assignor to Crane Packing Company, Chicago, Ill., a corporation of Illinois Application November 21, 1947, Serial No. 787,384

5 Claims. (Cl. 286—11.15)

This invention relates to mechanical rotary seals and particularly to such seals using a rigid sealing washer which must be prevented from rotating relative to the structure from which it is supported and to which it is sealed.

The principal object of this invention is to provide an inexpensive means for driving the sealing washer of a mechanical rotary seal from a shaft or the like on which the washer is supported.

More specifically, the object of this invention is to provide a drive means for a sealing washer wherein the drive means performs a dual function, so that one means will drive the washer and at the same time will be capable of performing the function of an oil slinger or the like.

A further object of this invention is to provide a mechanical rotary seal for a water pump or the like which seal will be extremely inexpensive to make and at the same time will be readily installed.

Figure 1:
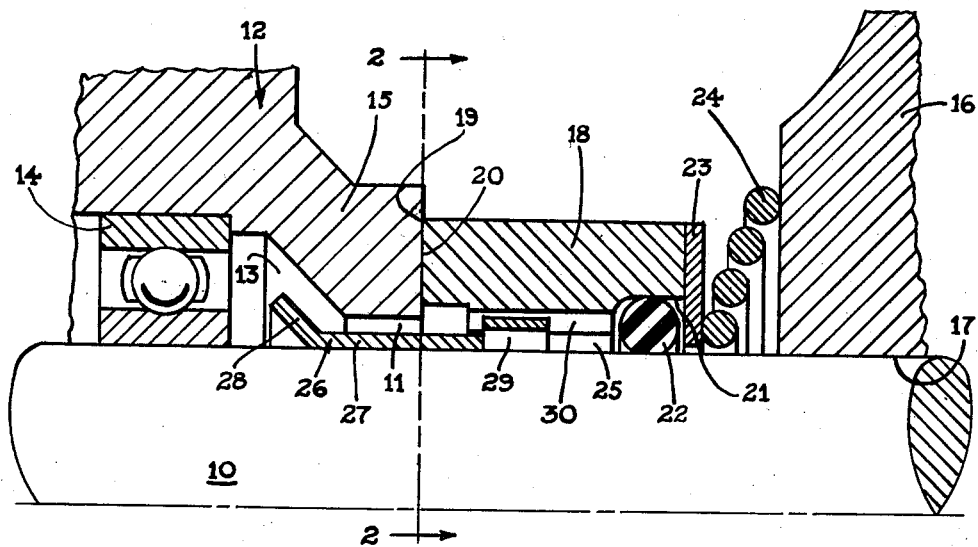
Figure 2:
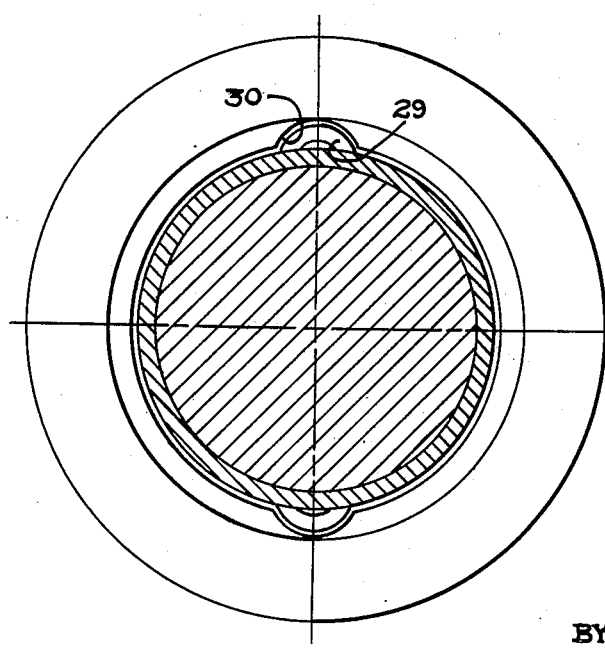

These and other objects and features of this invention will become apparent from the following detailed description when taken together with the accompanying drawing, in which Fig. 1 is a quarter section through a seal embodying this invention and through the associated relatively rotatable structures which are to be sealed; and Fig. 2 is a fragmentary elevation taken along lines 2—2 of Fig. 1, showing the driving means for the washer.

Referring now to Fig. 1 for a detailed description of this invention, there is shown at 10 a shaft which passes through an opening 11 in a housing 12, the opening 11 being enlarged at 13 to accommodate an anti-friction bearing 14 from which the shaft is supported. Said bearing 14 is lubricated and the lubricant is confined to substantially the opening 11 by the seal to be hereinafter described.

Housing 12 is formed with a radially inwardly extending partition 15 forming two chambers, the chamber at the right-hand side of the partition as viewed in Fig. 1 being adapted to contain water or other fluid which must be prevented from passing through the opening 11. The said fluid is operated upon by an impeller 16, only a fragmentary portion of which is shown, said impeller being apertured at 17 and pressed upon shaft 10 so as to be driven thereby.

The seal for preventing the escape of fluid into opening 11 is comprised of a washer 18 preferably made of rigid anti-friction material and having a substantially radially disposed surface 19 which has been ground or otherwise suitably finished to render it perfectly smooth and flat. A similarly ground or otherwise finished radially disposed surface 20 is provided on partition 15, surface 19 on washer 18 being made to bear against surface 20 to provide a fluid-tight running fit therebetween.

Washer 18 is formed with a recess 21 on the interior thereof into which is pressed a flexible, deformable resilient endless ring 22 of rubber, either natural or synthetic or a combination of the two, to provide a fluid-tight seal between the washer and shaft 10. Said ring 22 is preferably formed with a circular radial cross-section so as to allow axial movement of washer 18 relative to shaft 10 without imposing any uneven stresses or resistance upon the washer 18. Recess 21 is closed off on the right-hand side as viewed in Fig. 1 by a rigid washer 23, and a conical spring 24 is compressed between impeller 16 and washer 23 so as to hold said washer 23 against washer 18 and the latter against partition 15. Washer 18 is also provided with an opening 25 which is somewhat larger than the diameter of shaft 10 so as to leave an annular space therebetween.

It will be observed that if for any reason the friction between surfaces 19 and 20 increases to any appreciable extent a torque will be imposed upon ring 22 which may cause slippage between the ring and shaft or between the ring and washer 18. This slippage may be harmful to the ring and hence should be avoided. The remedy for such slippage is to provide a connection between washer 18 and shaft 10 which will permit the washer to move axially relative to the shaft and which at the same time will prevent relative rotation therebetween. Such a connection is provided by the means now to be described.

It is customary in a construction such as that shown in Fig. 1 to provide an oil slinger for the oil tending to pass along the shaft into opening 11. The slinger is shown at 26 and comprises a sleeve 27 of rigid material which is pressed upon shaft 10 so as to be rotatable with the shaft by reason of the friction developed by the press fit. On the left-hand side of sleeve 27 as seen in Fig. 1, said sleeve is expanded to form a conical flange 28 which operates upon the oil seeping past bearing 14 to fling it radially outwardly and thereby return it to the bearing. The conical shape of the flange tends to impart a slight axial direction to the movement of the oil to insure the return of the oil to the vicinity of the bearing.

The opposite end of sleeve 27 is formed with a plurality of lugs 29 which, as shown in Fig. 2, may be in the form of bosses extending radially outwardly from the surface of the sleeve. These lugs 29 extend into axially disposed notches 30 formed on the interior of opening 25 in washer 18 and hence prevent relative rotation between sleeve 27 and washer 18 but at the same time permitting washer 18 to move axially along the sleeve as required by wear or other circumstances.

It will be apparent that a drive means for washer 18 has been provided which involves no additional expense other than that required to form the lugs 29 in sleeve 27 and that the impeller need not be provided with any special means for driving washer 18 such as the slotted cup heretofore used. The washer 18 likewise may be simplified since it is not required to provide the washer with ears extending into the slots of the driving cup. The economy effected in eliminating the driving cup on the impeller and the ears on the washer more than offset the cost of the lugs and hence a less expensive seal results.

It is understood that other sealing means than the ring 22 may be used without departing from this invention. It is understood further that this invention is not limited to the embodiment illustrated herein but is to be determined by the appended claims.

What is claimed is:

1. In a rotary seal device for relatively rotatable structures one of which is a radially inwardly extending partition, said device having a sealing washer on one side of the partition and contacting the partition with a running fit and a flexible sealing element for sealing the washer with respect to the other structure, said washer, partition and sealing element comprising a fluid-tight seal between the structures to form two chambers; a lubricant in one chamber, an oil slinger in the lubricant chamber on the side of the partition opposite the washer, said slinger being rotatable with the other structure, and an axially slidable, rotary driving connection between the slinger and sealing washer.

2. In a rotary seal device for relatively rotatable structures one of which is a radially inwardly extending partition, said device having a sealing washer on one side of the partition and contacting the partition with a running fit and a flexible sealing element for sealing the washer with respect to the other structure, said washer, partition and sealing element comprising a fluid-tight seal between the structures to form two chambers; a lubricant in one chamber, a sleeve rotatable in the lubricant chamber with the said other structure, a flange on the sleeve and extending outward on the side of the partition opposite the washer for performing the function of a lubricant slinger, and an axially slidable rotary driving connection between the sleeve and sealing washer.

3. In a rotary seal device for relatively rotatable structures one of which is a radially inwardly extending partition, said device having a sealing washer on one side of the partition and contacting the partition with a running fit and a flexible sealing element for sealing the washer with respect to the other structure, said washer, partition and sealing element comprising a fluid-tight seal between the structures to form two chambers; a lubricant in one chamber, a metal sleeve pressed upon the said other structure in the lubricant chamber so as to be rotatable with said other structures, a flange at one end of the sleeve and extending outward on the side of the partition opposite the washer for performing the function of a lubricant slinger, and an axially slidable rotary driving connection between the sleeve and sealing washer.

4. In a rotary seal device for relatively rotatable structures one of which is a radially inwardly extending partition, said device having a sealing washer on one side of the partition and contacting the partition with a running fit and a flexible sealing element comprising a fluid-tight seal between the structures to form two chambers, a lubricant in one chamber, a metal sleeve pressed upon the said other structure in the lubricant chamber so as to be rotatable with said other structure, said sleeve being telescoped at one end into the washer, a flange at one end of the sleeve and extending outward on the side of the partition opposite the washer for performing the function of a lubricant slinger, and an axially slidable rotary driving connection between the telescoped end of the sleeve and the sealing washer.

5. In a rotary seal device for effecting a fluid-tight seal between a housing including an anti-friction bearing and a shaft passing through an opening in the housing, said housing having a radially disposed wall spaced from said bearing, said device having a sealing washer in running contact with the radially disposed wall and a flexible sealing element for sealing the washer with respect to the shaft, said sealing element surrounding and being spaced from the shaft, said washer and sealing element comprising a fluid-tight seal between the wall and shaft to form two chambers, a lubricant in one chamber, a metal sleeve pressed upon and rotatable with the shaft in the lubricant chamber and having one end in proximity to the bearing and the other end telescoped into the washer, a flange on the end in proximity to the bearing, said flange extending outward on the side of the radially disposed wall opposite the washer and acting as a lubricant slinger and the other end having a radially outwardly extending lug, said washer having an axially disposed recess into which the lug projects to form an axially slidable rotary driving connection between the sleeve and washer.

CARL E. SCHMITZ.

REFERENCES CITED

The following references are of record in the file of this patent:

UNITED STATES PATENTS

| Number | Name | Date |
|---|---|---|
| 1,307,815 | Fukao | June 24, 1919 |
| 1,880,846 | Dake | Oct. 4, 1932 |
| 2,113,167 | Baumheckel | Apr. 5, 1938 |
| 2,347,118 | Matter | Apr. 18, 1944 |
| 2,375,085 | Curtis | May 1, 1945 |
| 2,464,989 | Payne | Mar. 22, 1949 |